United States Patent
Dakhil

(10) Patent No.: US 6,205,814 B1
(45) Date of Patent: Mar. 27, 2001

(54) APPARATUS AND METHOD FOR PRODUCING LIQUID NITROGEN

(76) Inventor: Farouk Dakhil, Viale R. Belloni 56, Rome (IT)

( * ) Notice: Subject to any disclaimer, the term of this patent is extended or adjusted under 35 U.S.C. 154(b) by 0 days.

(21) Appl. No.: 09/455,847

(22) Filed: Dec. 7, 1999

(51) Int. Cl.[7] .......................................................... F25J 1/00
(52) U.S. Cl. ............................ 62/643; 60/641.8; 60/651; 60/671
(58) Field of Search .................................. 62/235.1, 467, 62/615, 640, 643; 60/641.8, 641.9, 651, 671

(56) References Cited

U.S. PATENT DOCUMENTS

| | | | |
|---|---|---|---|
| 3,447,314 | * 6/1969 | Majkrzak | 60/651 |
| 3,516,248 | * 6/1970 | McEwen | 60/651 |
| 4,281,969 | * 8/1981 | Doub, Jr. | 62/467 |
| 4,720,978 | * 1/1988 | Spacer | 62/641.8 |
| 4,739,620 | * 4/1988 | Pierce | 60/641.8 |
| 5,666,818 | * 9/1997 | Manrique-Valadez | 62/235.1 |

* cited by examiner

*Primary Examiner*—Ronald Capossela
(74) *Attorney, Agent, or Firm*—Merchant & Gould P.C.

(57) ABSTRACT

Liquid nitrogen producing apparatus and method. Solar energy is used to heat liquid mercury which expands and applies pressure to an incompressible fluid which in turn drives a piston in a compression stroke. Air is pressurized and in an appropriate use device liquid nitrogen is obtained. Some of the liquid nitrogen is directed back to the reservoir of liquid mercury. The very cold liquid nitrogen causes the liquid mercury to contract which in turn moves the piston in a suction stroke to draw in make-up air.

6 Claims, 1 Drawing Sheet

FIG. 1
FIG. 2
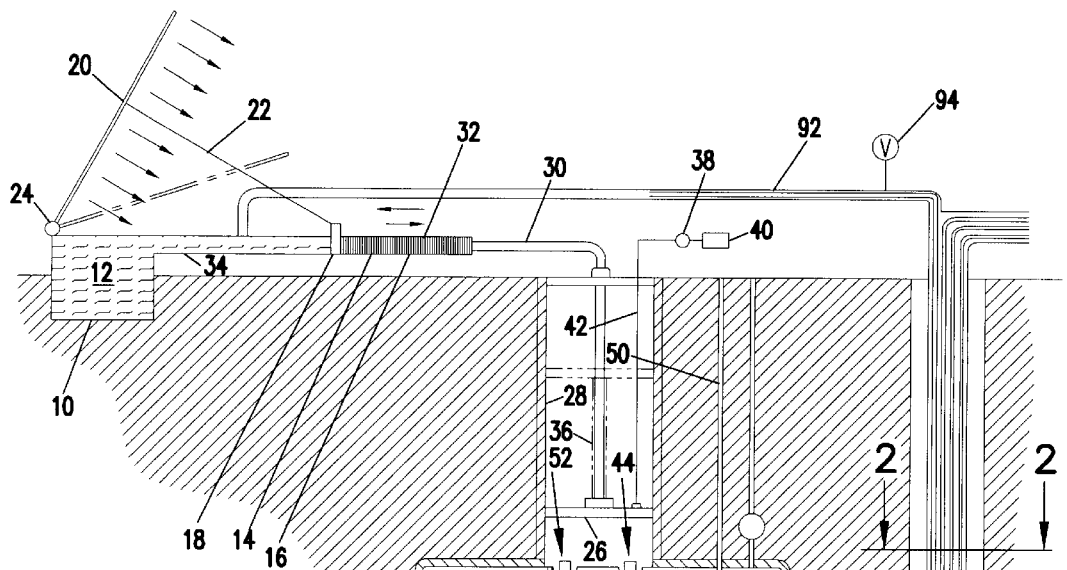
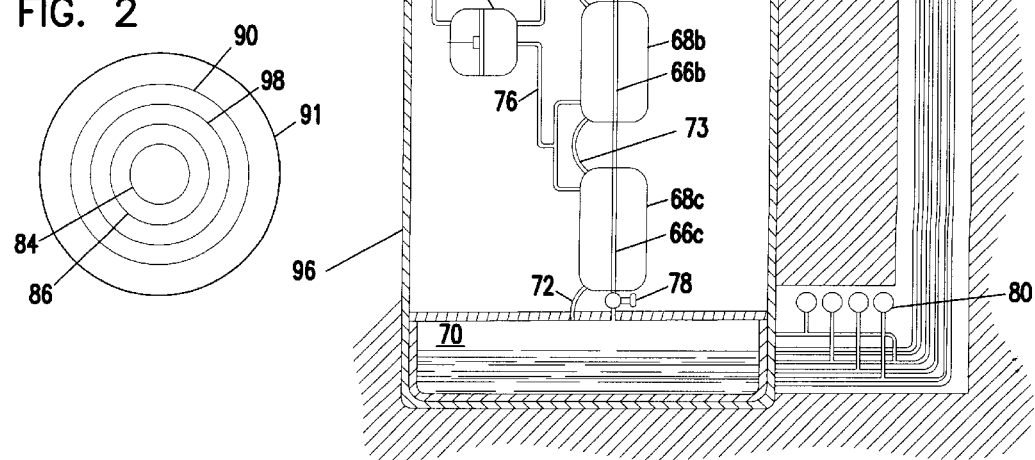

APPARATUS AND METHOD FOR PRODUCING LIQUID NITROGEN

FIELD OF THE INVENTION

The present invention is directed to an apparatus and a method for producing liquid nitrogen which uses the sun and some of the produced liquid nitrogen to alternately heat and cool contained mercury so as to drive a piston in compression and suction strokes.

BACKGROUND OF THE INVENTION

Although global warming is open to debate, it is well documented that there is an increasingly large hole in the ozone layer of the stratosphere of our planet. Both these issues are alarming and extremely dangerous for future generations. We may need to develop whole new technologies to address these issues in a way which will reverse the detrimental effects caused by them.

The emission of gases like carbon dioxide and carbon monoxide from internal combustion engines and other vehicle or heavy industry sources must be reduced and eliminated. This will require the large oil and gas companies and oil and gas producing countries to refocus their objectives. The present invention is directed to producing liquid nitrogen with the idea that liquid nitrogen could ultimately be used as a power source in engines. Nitrogen comprises approximately 80% of the earth's atmospheric air volume and is thus essentially infinitely available. The oil and gas industry already have many active and abandoned oil and gas wells. It is possible that with the present invention the oil and gas wells presently existing could be converted to cylinders having pistons in them for the purpose of compressing air to produce both liquid nitrogen and liquid oxygen. Using such existing structure in conjunction with the present invention would result in extremely low energy usage for the production of both liquid nitrogen and oxygen. Thus, production would also be at a very low cost.

SUMMARY OF THE INVENTION

The present invention is directed to apparatus for producing liquid nitrogen. The apparatus includes a first reservoir substantially filled with liquid mercury and a second reservoir substantially filled with a substantially incompressible fluid. There is a barrier in a communication region between the first and second reservoirs which separates and maintains the liquid mercury and the incompressible fluid at a same pressure. There is a cylinder and a piston operably stalled in the cylinder to pressurize the air. The cylinder has a first system for passing the ambient air through it during a suction stroke of the piston and a second system for passing the pressurized air through it during a compression stroke of the piston. There is a mechanism for containing the incompressible fluid which connects the second reservoir and the piston. The incompressible fluid flows between the second reservoir and the containing mechanism to move the piston in the compression and suction strokes. There is mechanism for heating and cooling the mercury. And, there is a use device in fluid communication with the second valve system. The use device produces at least liquid nitrogen from the pressurized air.

The heating and cooling mechanism can advantageously use the sun for heating and can use some of the produced liquid nitrogen for cooling. The cylinder can be established in a shaft formed in the earth, such as a small shaft formerly used for an oil or gas well.

The present invention is also directed to the method for using the apparatus for producing liquid nitrogen. The method includes the steps of heating the mercury in the first reservoir so that the pressure of the expanding mercury is transferred to the incompressible fluid in the second reservoir, moving the piston through a compression stroke so that pressurized air is forced from the second valve system, producing liquid nitrogen with a use device from the pressurized air, cooling the mercury with some of the produced liquid nitrogen, and moving the piston in a suction stroke so that ambient air is drawn into the cylinder through the first valve system.

BRIEF DESCRIPTION OF THE DRAWINGS

FIG. 1 is an illustration which depicts the invention; and

FIG. 2 is a cross-sectional view taken along line 2—2 of FIG. 1.

DETAILED DESCRIPTION OF THE PREFERRED EMBODIMENT

With reference to FIG. 1, the present invention contemplates heating a reservoir of mercury, for example, using solar heat, to expand the mercury and create a pressure which is transmitted through an incompressible fluid, like oil, to a piston/cylinder assembly. The piston/cylinder assembly compresses ambient air and provides it to an appropriate use device which accomplishes at least the liquification of nitrogen. There is a feedback mechanism which directs some of the liquid nitrogen to the mercury reservoir at the appropriate time in order to cool the mercury. Thus, the mercury goes through expansion and contraction causing the piston/cylinder assembly to go through compression and suction phases. The entire process is capable of pressurizing air at a low cost, and, therefore, obtaining through the use device liquid nitrogen, and probably also liquid oxygen, at low cost.

The preferred embodiment has the piston/cylinder assembly located in a shaft in the earth. Thus, a combination of gravity and pressure applied by the incompressible fluid moves the piston in a compression stroke. To the degree the suction stroke cannot raise the piston to an appropriate height for beginning again the compression stroke, a winch powered by an appropriate motor may be needed.

More particularly, a first reservoir 10 is fully enclosed and filled or substantially filled with liquid mercury 12. A second reservoir 14 is fully enclosed and filled or substantially filled with a substantially incompressible fluid 16, like oil. A barrier 18 separates the liquid mercury from the incompressible fluid.

A mirror 20 is positioned so that when it is in a first position as shown in solid line, it reflects energy from the sun onto a surface of reservoir 10 which heats the liquid mercury 12 and causes it to expand. Mirror 20 is operably hinged or otherwise made movable so that as the expansion proceeds, the mirror is moved to a second position as shown in broken line which prevents it from reflecting energy from the sun onto reservoir 10. Preferably, there is a cable 22 connected between mirror 20 and separator 18 which automatically functions to move mirror 20 between its first and second positions. The hinge mechanism 24 may include, for example, a torsion spring (not shown) which biases mirror 20 to its first position. Alternatively, a motor or other power mechanism (not shown) could be used to move mirror 20 back from its second position to its first position when the liquid mercury 12 cools and contracts.

Piston 26 is operably fitted within cylinder 28. Incompressible fluid 16 is communicated via a tube 30 having an accordion expansion mechanism 32 or other equivalent expansion mechanism located in a region between tube 30 and second reservoir 14. Tube 30 preferably has a smaller diameter than a tubular portion 34 of first reservoir 10. To the extent that tube 30 may be flexible, it will be necessary to include a pipe 36 extending upwardly from piston 26 to give sideways support to flexible tube 30 so that most of the pressure as a result of incompressible fluid 16 can be applied to move piston 26. Piston 26 moves from a first position shown in broken line due to the pressure of incompressible fluid 16 and due to gravity to a second position shown in solid line. When the liquid mercury contracts, the incompressible fluid is moved in the direction of the separator 18 as the mercury contraction takes place so that tube 30 will pull piston 26 upwardly from its second position to its first position. If an assist is needed, a winch 38 powered by motor 40 can aid in moving piston 26 via cable 42.

As piston 26 moves from position two to position one, make-up air is drawn into cylinder 28 through first valve system 44. Make-up air comes both from heat exchangers 68a, b, c of use device 46 via line 48 and also from outside air via line 50. As piston 26 moves from position one to position two in a compression stroke, the air is compressed to become pressurized air and it passes through second valve system 52 into use device 46. Use device 46 is only a part of the present invention to the extent that it makes use of the pressurized air to obtain at least liquid nitrogen. A representative use device is depicted in the drawing. The depicted use device 46 shows apparatus which uses the Linde process as modified by Claude. The apparatus and process of use device 46 are conventional.

Use device 46 has a tube 54 leading from second valve system 52 to filter unit 56. Filter unit 56 removes any residual oil, water, carbon dioxide, etc., remaining from compressing the air in cylinder 28. From filter unit 56, the pressurized air moves via line 58 to tank 60. Tank 60 is filled with water at ambient temperature. Lines 62 and 64 recirculate the water through a system (not shown) which maintains the temperature. During the compression stroke of piston 26, the pressurized air could increase by 100 or 200 atmospheres. With the increased pressure, the pressurized air would have a temperature rise from perhaps 290K at one atmosphere to about 315K at the increased pressure. Tank 60 reduces the pressurized air temperature back to approximately ambient or 290K.

From tank 60, the pressurized air flows via line 66 to heat exchangers 68a, b, c. At heat exchanger 68a, b, c cool air flows into heat exchangers 68c from enclosure 70 via line 72 and from expansion chamber 74 via line 76. Heat exchanger 68c is in further fluid communication with exchanger 68b via line 73 and exchanger 68a via line 25. The pressurized air from tank 60 cools substantially in line 66a, 66b, 66c which are contained within heat exchanger 68a, b, c. In order to achieve maximum cooling, the pressurized air flows through all tanks 68a, 68b and 68c. At each heat exchanger, the pressurized air is cooled more and more. It is released at the Joule-Thomson valve 78 into enclosure 70 to expand and liquify.

Expansion chamber 74 functions as a compensator to maintain pressure in the system. When first valve system 44 opens and second valve system 52 closes during a suction stroke, air flows into cylinder 28 with the help of pressure from the driving side of chamber 74. Both valve systems are closed during a compressing stroke. When second valve system 52 opens and first valve system 44 is closed after the compression stroke, pressurized air expands into use device 46 via lines 54 and 77. One side of expansion chamber 74 is in communication with cylinder 28 through second valve system 52 in order to move air in and out of the driving side of expansion chamber 74.

Normally, a so-called rectification pillar (not shown) is used in enclosure 70 in order to separate liquid nitrogen from liquid oxygen. Through valves 80, liquid oxygen and liquid nitrogen are metered into the various concentric passages of conduit 82. As shown in FIG. 2, conduit 82 has a central tube 84 for production liquid nitrogen. The tube 86 concentric to tube 84 is filled with liquid nitrogen and acts as an insulation jacket. The tube 88 concentric to tube 86 contains liquid oxygen and also acts as an insulation jacket. Finally, the outer tube 90 contains more liquid nitrogen and is enclosed in insulation jacket 91 in order to conserve low temperature of all tubes. Outer tube 90 branches at tube 92. Tube 92 is directed back to reservoir 10 so that some of the product liquid nitrogen is placed against a surface of reservoir 10 at an appropriate time in order to contract the liquid mercury 12. Valve 94 controls the liquid nitrogen directed toward reservoir 10.

The various valves 80 function in a manner conventional to use device 46 to drain off liquid nitrogen and liquid oxygen. Valve 94 is timed along with first and second valve systems 44 and 52 in order to reciprocate piston 26 in a periodic manner. The reciprocation of piston 26 through suction and compression strokes depends on the heating and cooling of liquid mercury 12. Thus, movement of mirror 20 is also coordinated with the control of the various valves.

The process which takes place within use device 46 is isenthalpic. Thus, the apparatus of use device 46 is contained within an insulated container 96.

In operation, energy from the sun is directed onto a surface of reservoir 10 to heat the liquid mercury in first reservoir 10. The liquid mercury 12 expands and applies pressure through separator 18 to incompressible fluid 16 in second reservoir 14. The incompressible fluid forces piston 26 to move in a compression stroke. Use device 46 produces liquid nitrogen using the pressurized air which is forced from cylinder 28 through second valve system 44. Some of the liquid nitrogen is directed back to a surface of reservoir 10 via line 92 in order to cool liquid mercury 12. As liquid mercury 12 cools, mirror 20 is moved from its second position to its first position and piston 26 is moved in a suction stroke. Ambient air is drawn via lines 48 and 50 through first valve system 44 into cylinder 28. If necessary, winch 38 powered by motor 40 aids in the movement of piston 26 from its second position to its first position.

Thus, the present invention is presently embodied as an apparatus and a method. The apparatus is preferably located such that cylinder 28 is formed in a shaft in the earth. Conduit 82 and other necessary pipes, such as air inlet tube 50 can be located in the same shaft in the earth as cylinder 28 or in a separate shaft in the earth.

While the invention has been particularly shown and described with reference to preferred embodiments discussed herein, it will be understood by those skilled in the art that various other changes in the form and details may be made without departing from the spirit and scope of the invention.

We claim:

1. Apparatus for producing nitrogen, comprising:
   a first reservoir fully-enclosed and substantially filled with liquid mercury;
   a cylinder and a piston operably installed therein to compress ambient air to pressurized air, said cylinder having a first valve system for passing said ambient air therethrough during a suction stroke of said piston and a second valve system for passing said pressurized air therethrough during a compression stroke of said piston;

a second reservoir fully-enclosed and substantially filled with a substantially incompressible fluid;

means, between said first and second reservoirs, for separating and maintaining said liquid mercury and said incompressible fluid at a same pressure;

fluid-containing means for connecting said second reservoir and said piston, said incompressible fluid flowing between said second reservoir and said fluid-containing means to move said piston in said compression and said suction strokes;

means for heating and cooling said mercury; and a use device in fluid communication with said second valve system, said use device producing at least liquid nitrogen from said pressurized air.

2. The apparatus in accordance with claim 1 wherein said heating and cooling means includes a mirror for heating said mercury with reflected sun rays.

3. The apparatus in accordance with claim 2 wherein said heating and cooling means includes means for moving said mirror between a first position wherein said mirror heats said mercury with reflected sun rays and a second position wherein said mirror does not reflect sun rays to heat said mercury.

4. The apparatus in accordance with claim 2 wherein heating and cooling means includes a plumbing system for directing a portion of said liquid nitrogen produced by said use device to a location where said liquid nitrogen causes cooling of said mercury.

5. The apparatus in accordance with claim 1 wherein said cylinder is formed in a shaft in the earth.

6. A method for producing liquid nitrogen using mercury in a first reservoir separated from and able to transfer pressure to an incompressible fluid in a second reservoir such that the incompressible fluid applies pressure to a piston operably installed in a cylinder to move the piston in a suction stroke to draw ambient air through a first valve system into the cylinder and to move the piston in a compression stroke to force pressurized air through a second valve system to a use device for producing at least liquid nitrogen, the mercury expanding and contracting being due to means for heating and cooling the mercury, said method comprising the steps of:

heating said mercury in said first reservoir, said mercury expanding and applying pressure to said incompressible fluid in said second reservoir;

moving said piston in a compression stroke due to the pressure being applied by said incompressible fluid to said piston;

producing liquid nitrogen in said use device using said pressurized air being forced from said cylinder through said second valve system;

cooling said mercury; and moving said piston in a suction stroke as said mercury and said incompressible fluid contract allowing ambient air to be drawn into said cylinder through said first valve system during said suction stroke.

* * * * *